Figure 1:
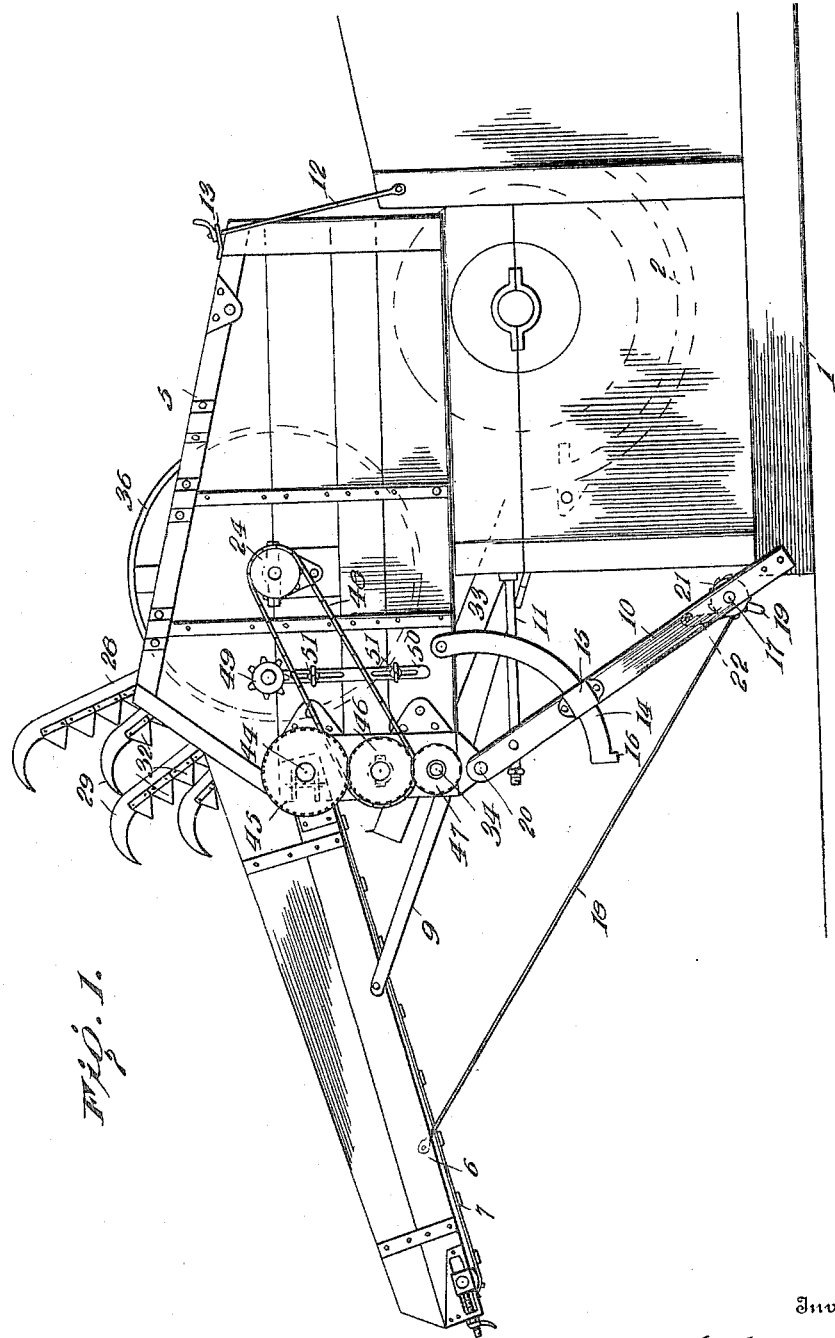

No. 821,646. PATENTED MAY 29, 1906.
F. JUNO.
BAND CUTTER AND FEEDER.
APPLICATION FILED JULY 14, 1905.
4 SHEETS—SHEET 1.

Witnesses
Inventor
F. Juno.
By
Attorneys

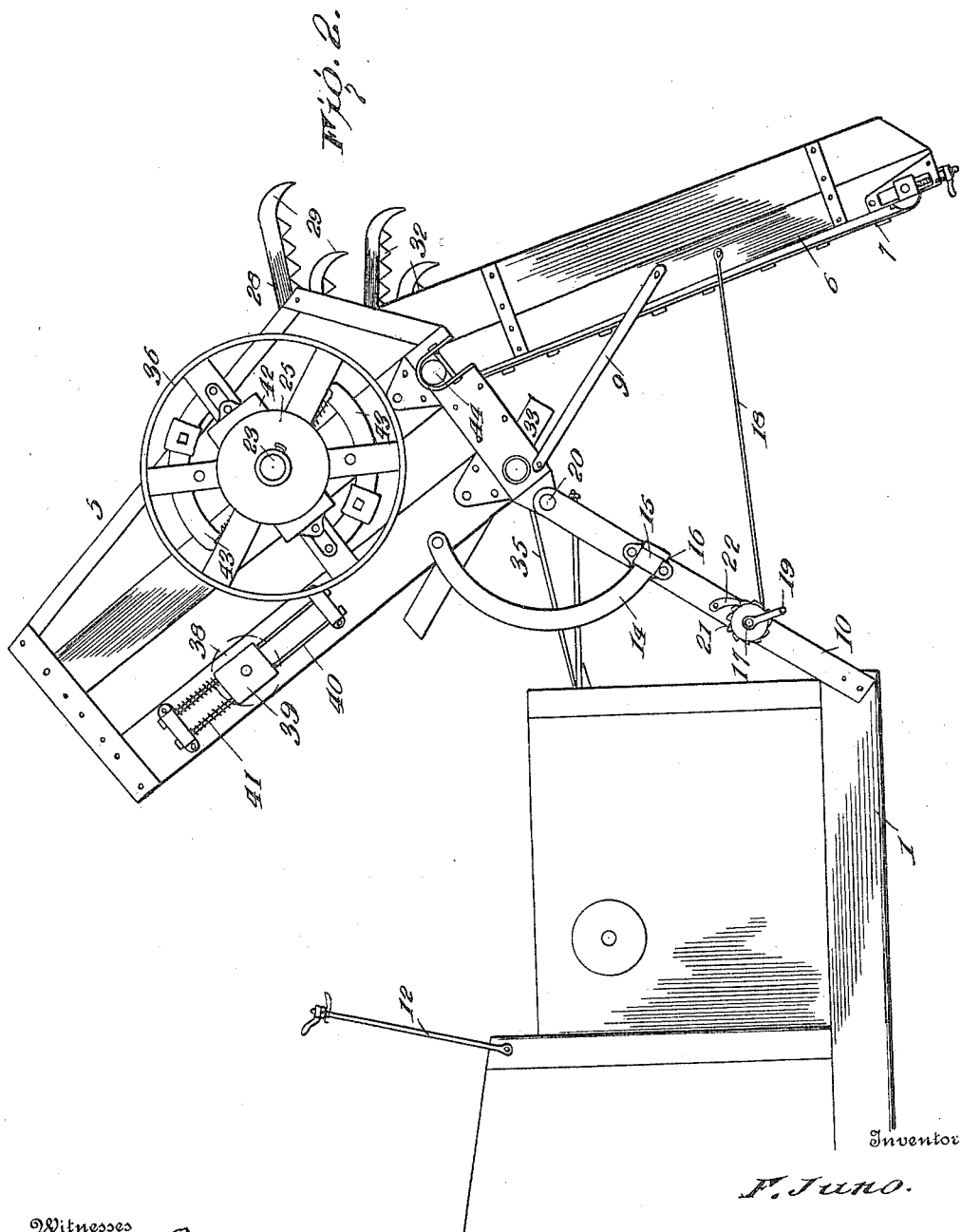

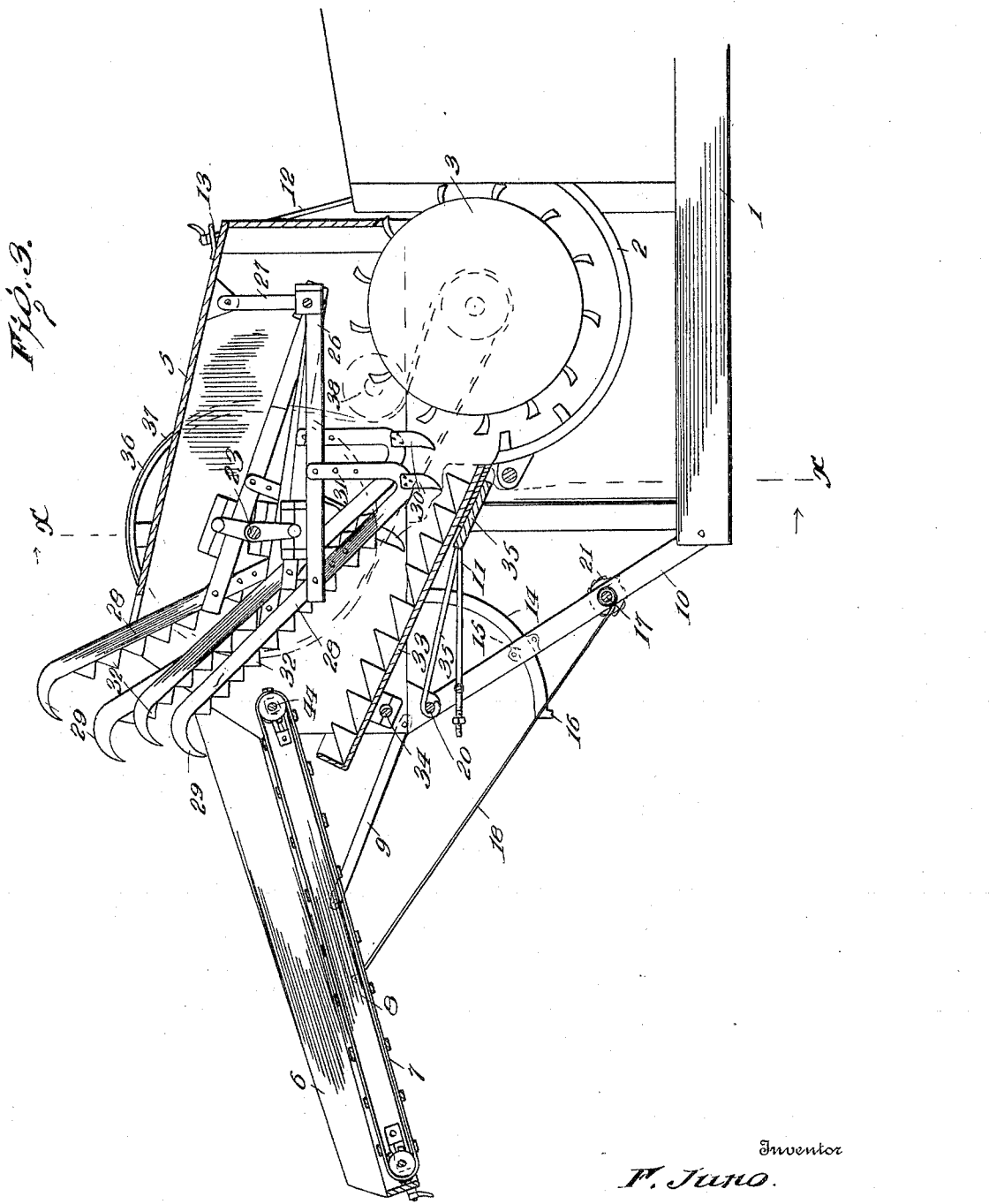

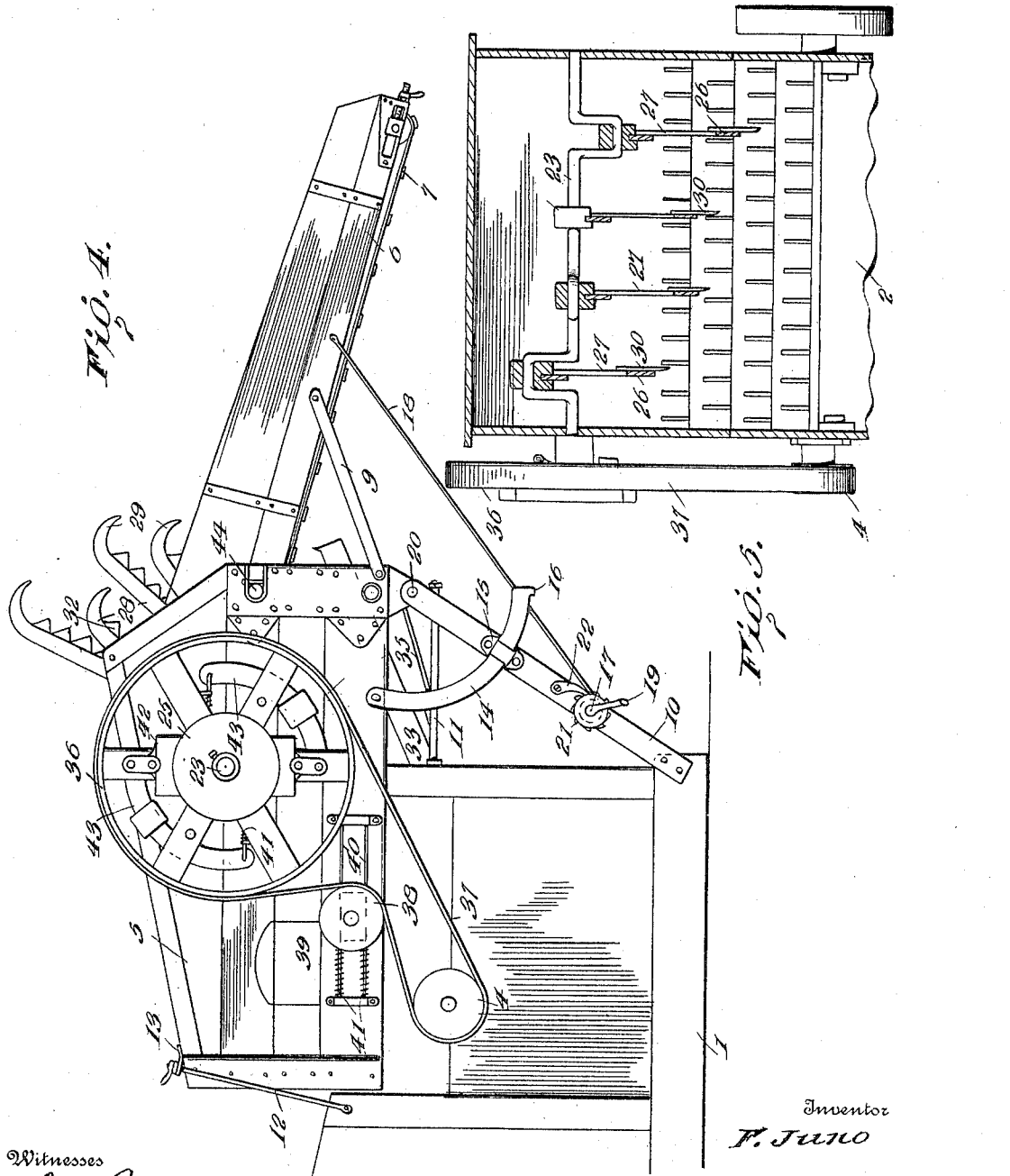

UNITED STATES PATENT OFFICE.

FRANK JUNO, OF TIMKEN, KANSAS.

BAND-CUTTER AND FEEDER.

No. 821,646.   Specification of Letters Patent.   Patented May 29, 1906.

Application filed July 14, 1905. Serial No. 269,675.

*To all whom it may concern:*

Be it known that I, FRANK JUNO, a citizen of the United States, residing at Timken, in the county of Rush and State of Kansas, have invented certain new and useful Improvements in Band-Cutters and Feeders, of which the following is a specification.

This invention appertains to means whereby grain is fed to threshing mechanisms, the purpose being to devise a feeder and mountings therefor which will admit of access being readily had to the threshing mechanism for repairs or for removing obstructing matter or for any other desired purpose.

The invention also has for its object to improve the general structure of the class of mechanism aforesaid whereby its efficiency is enhanced and the parts so disposed as to admit of their replacement, while at the same time made lighter running and the feeder as a whole adapted to be moved aside and replaced to meet existing conditions.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a side elevation of a band-cutter and feeder, showing it applied to a threshing-machine and in operative position. Fig. 2 is a view similar to Fig. 1 of the mechanism as seen from the opposite side, the feeder being tilted to admit of access to the threshing mechanism from above and to the feeding mechanism from below. Fig. 3 is a longitudinal section of the feeder, showing it arranged as illustrated in Fig. 1. Fig. 4 is a side view of the feeder from the same side as Fig. 2, showing it resting upon the thresher. Fig. 5 is a transverse section about on the line $x$ $x$ of Fig. 3 looking in the direction of the arrows.

Corresponding and like parts are referred to in the following description and indicated in all the views of the drawings by the same reference characters.

The framework of the thresher is indicated at 1 and may be of any design and make. The threshing mechanism, as usual, is located at one end of the framework 1 and comprises the breast or concave 2 and threshing-cylinder 3, the latter being driven from any suitable source of power applied to an end extension of its shaft, the opposite end of said shaft being provided with a band-pulley 4, from which power is taken for operating the working parts of the feeder. The framework of the feeder comprises a housing 5 and a carrier 6, the latter being of usual construction and comprising side guards, an endless apron 7, and a supporting-table 8, arranged between the side guards and between the upper and lower portions of the endless apron, so as to support the grain in its travel to the band-cutting and threshing mechanisms. Braces 9 are interposed between the housing 5 and the carrier 6 to prevent relative movement thereof.

The housing 5 receives the band-cutting mecanism as well as the grain-pan bridging the gap between the delivery end of the carrier and the receiving end of the thresher. The housing is arranged so as to extend over and rest upon the end portion of the framework 1, containing the threshing mechanism, and is mounted so as to tilt, as indicated in Fig. 2, thereby admitting of access to the threshing mechanism, as well as to the band-cutting mechanism, when required for any desired purpose. Bars 10 are firmly attached at their lower ends to the framework 1 and incline upwardly and away from said framework and are braced at their upper ends by stay-rods 11, which are interposed between the upper portion of the framework 1 and the upper ends of the bars 10. The housing 5 is mounted upon the upper ends of the bars 10, so as to tilt thereon. When the feeder is in normal position—that is, resting upon the frame 1—it is held in place by means of tie-rods 12, which are loosely connected at their lower ends to the frame 1 and are adapted to have their upper ends engage with irons 13, fitted to the upper rear portion of the housing 5, the upper ends of the tie-rods 12 being threaded and provided with hand-nuts by means of which said housing may be firmly held in place. To steady the framework of the feeder in its tilting movements, curved bars 14 are attached to the housing 5 and passed through keepers 15, attached to the bars 10. A lug 16 at the lower end of each curved bar 14 constitutes a stop and is adapted to come in contact with the coöperating keeper 15, so as to limit the tilting of the feeder when thrown out of the way, as indicated most clearly in Fig. 2.

The feeder may be tilted in any manner, and for convenience the shaft 17 is journaled in the lower portion of the inclined bars 10, and cords 18 are made fast at one end to said shaft and at the opposite end to the carrier 6 at some distance from the pivotal connection of the carrier with said bars 10. Upon loosening the hand-nuts at the upper ends of the rods 12 and disengaging the same from the irons 13 and turning the shaft 17 by means of a crank 19 fitted thereto the lower ends of the rods 18 are wound upon the shaft, thereby drawing down upon the outer end of the carrier 6 and causing said carrier to tilt upon its pivotal connection 20 with the bars 10. The feeder is held in the adjusted position by means of a ratchet-wheel 21, fast to the shaft 17, and a coöperating pawl 22, pivoted to a bar 10. The rear portion of the feeder being the heavier, the normal tendency of the feeder is to gravitate toward the thresher. Hence upon loosening the ropes 18 by disengaging the pawl 22 from the ratchet 21 and admitting the shaft 17 to turn backward the said feeder will automatically settle upon the thresher and may be secured by readjusting the rods 12 in the manner set forth. A crank-shaft 23 is journaled in opposite sides of the housing 5, and its crank portions extend therefrom at different angles. A sprocket-wheel 24 is fast to one end of the crank-shaft 23 and a pulley 25 is fast to the opposite end. A series of knives are mounted upon the crank portions of the shaft 23. Each knife consists of a bar 26, pivotally supported at its inner or rear end by means of a hanger or link 27, a bar 28, inclined to the bar 26 and having a hook 29 at its upper end and a blade 30 at its lower end, a brace 31, connecting the lower end of the inclined bar 28 with the bar 26, and a series of cutter-sections 32, projected from the lower edge of the bar 28. The blades 30 are considerably longer than the cutter-sections 32 and are adapted to approach close to the teeth of the threshing-cylinder 3, so as to coöperate therewith. The cutter-sections 32 sever the bands by means of which the grain is bound and also serve to lighten and loosen the grain and prevent its entering the thresher in bunches, which would tend to choke the same. The hooks 29 at the upper ends of the bars 28 engage with the bundle and drag the same forward and downward.

In the operation of the feeder the bars 28 move downward and rearward, thence upward and forward, this movement being due to the peculiar mounting of the knives—that is, by having the bars 26 supported at one end by the swinging links 27 and mounted at the opposite end upon the crank portions of the shaft 23. The upper ends of the bars 28 overhang the rear or delivery portion of the carrier, so as to insure their coming in contact with the grain and the positive feed of the latter to the threshing mechanism. A grain-pan 33 is located below the band-cutting mechanism and is rearwardly and downwardly inclined, and its forward portion underlaps the delivery end of the carrier, so as to prevent any waste of grain. The upper portion of the grain-pan is toothed or provided with notched bars which coöperate with the toothed bars 28 of the knives to insure positive feed of the grain to the thresher. The grain-pan receives a vibratory movement from crank portions of a shaft 34, arranged transversely of the lower forward corner of the housing 5 and mounted in bearings applied to the sides thereof. A transverse board 35 supports the delivery end of the grain-pan 33 and is connected to the pivot-rod 20 by means of rods or bars 35.

A band-pulley 36 is loosely mounted upon the shaft 23 and derives power from the pulley 4 by means of a belt 37. A pulley 38 bears against a portion of the belt 37 and is carried by a slide 39, mounted upon guides 40 and pressed forward by springs 41, mounted upon said guides 40. The band-pulley 36 is provided with weighted arms 43, and said arms have a spring connection 41 at one end with the pulley 36 and are operatively connected at the opposite end with clutch elements 42, which are arranged to grip the pulley 25 and cause rotation of the shaft 23 under normal conditions. Under abnormal conditions the clutch elements 42 move upward and release the pulley 25 and admit of the pulley 36 rotating without imparting movement to the operating part of the feeder. The pivoted arms or levers 43 and the adjunctive parts—such as the weights, spring connections 41, and clutch elements 42—constitute a governor mechanism, whereby the feeder when in operation is automatically thrown into and out of action.

A shaft 44 supports the sprocket-wheels, around which the upper inner portion of the carrier belt or apron 7 passes, and its projecting end is provided with a sprocket-wheel 45, which is in mesh with a sprocket-wheel 46, the latter in turn meshing with a sprocket-wheel 47, fast to the shaft 44. A sprocket-chain 48 connects the sprocket-wheel 46 with the sprocket-wheel 24. The sprocket-wheel 46 is of such construction as to have different speeds and preferably consists of independent members which are adapted to be thrown into or out of action by means of a spring-cotter or equivalent means. In order to compensate for variation in the tension of the sprocket-chain 48, an idler 49 is mounted upon a slide 50, which preferably consists of a slotted bar which is adapted to be held in the adjusted position by means of one or more set-screws 51.

Having thus described the invention, what is claimed as new is—

In a mechanism of the character set forth, the combination of a threshing mechanism, inclined bars extended from the framework thereof, stay-rods between the upper end portions of the inclined bars and the framework, a band-cutter and feeder mounted for tilting movement, a rod pivotally connecting the band-cutter and feeder with said inclined bars, curved bars and keepers for directing and steadying the band-cutter and feeder in its tilting movements, means for tilting said band cutter and feeder, a grain-pan, a shaft having crank portions supporting the outer end portion of the grain-pan, a support 35 for the inner end portion of said grain-pan, and rods connecting the support 35 with the rod pivotally connecting the band-cutter and feeder with its supporting-bars.

In testimony whereof I affix my signature in presence of two witnesses.

FRANK JUNO. [L. S.]

Witnesses:
W. A. HAYES,
J. B. CHLUMSKEY.